(12) United States Patent
Mathewson et al.

(10) Patent No.: US 7,353,297 B2
(45) Date of Patent: Apr. 1, 2008

(54) HANDLING OF WRITE TRANSACTIONS IN A DATA PROCESSING APPARATUS

(75) Inventors: Bruce James Mathewson, Papworth Everard (GB); Antony John Harris, Sheffield (GB)

(73) Assignee: ARM Limited, Cambridge (GB)

( * ) Notice: Subject to any disclaimer, the term of this patent is extended or adjusted under 35 U.S.C. 154(b) by 520 days.

(21) Appl. No.: 10/862,885

(22) Filed: Jun. 8, 2004

(65) Prior Publication Data
US 2005/0273536 A1 Dec. 8, 2005

(51) Int. Cl.
*G06F 3/00* (2006.01)

(52) U.S. Cl. ............................................. 710/5; 710/33

(58) Field of Classification Search ................ 710/5, 710/33

See application file for complete search history.

(56) References Cited

U.S. PATENT DOCUMENTS 6,772,254 B2 * 8/2004 Hofmann et al. ........... 710/110

* cited by examiner

*Primary Examiner*—Donald Sparks
*Assistant Examiner*—Harold Kim
(74) *Attorney, Agent, or Firm*—Nixon & Vanderhye, P.C.

(57) ABSTRACT

A data processing apparatus and method of handling write transactions in such an apparatus is provided. The apparatus has a plurality of devices, and bus circuitry providing connection paths between the plurality of devices. At least one of the devices has a bus master interface operable to generate write transactions for output via the bus circuitry, whilst at least one of the devices has a bus slave interface operable to receive the write transactions from the bus circuitry. A write transaction includes transferring a write address from a bus master interface to a bus slave interface and separately transferring write data from the bus master interface to the bus slave interface. In accordance with embodiments of the present invention, the bus master interface is allowed to generate a write transaction such that the write data is received at the bus slave interface before the associated write address. This leads to a significant decrease in the complexity of the apparatus.

14 Claims, 3 Drawing Sheets

HANDLING OF WRITE TRANSACTIONS IN A DATA PROCESSING APPARATUS

BACKGROUND OF THE INVENTION

1. Field of the Invention

The present invention relates to a data processing apparatus and method, and in particular to techniques for handling write transactions in a data processing apparatus.

2. Description of the Prior Art

A data processing apparatus may comprise a plurality of devices interconnected by bus circuitry. Data is transferred between the devices via the bus circuitry. One particular type of transfer that may take place is referred to as a write transaction, which is generated by a bus master, and issued via the bus circuitry to a destination bus slave. When generating a write transaction, the bus master will generate a write address identifying an address in memory at which the data the subject of the write transaction should be written, and will separately generate the write data to be written at that address. The write address will be transferred over the bus circuitry separately to the write data.

The devices within the data processing apparatus will either have a bus master interface, a bus slave interface, or both, dependent on whether those devices are to act as bus masters, bus slaves, or both bus masters and bus slaves (dependent on the transaction).

Considering a write transaction, it will be appreciated that the bus slave responsible for storing the write data at the address specified by the write address will need to have received the write address before it can take steps to store the write data. Accordingly, known protocols used to define how signals should be transferred over the bus circuitry typically require that the write address is presented at an interface at the same time or before the actual write data associated with that write address.

As the design of such bus circuitry increases in complexity, some variations can occur in the speed with which a write address and its associated write data are transferred over the various connection paths provided by the bus circuitry, and accordingly it is typically required to provide logic at the various interfaces to perform any necessary re-alignment of the write data and the write address to ensure that the above protocol requirement is met.

It is an object of the present invention to provide an improved data processing apparatus which enables more efficient handling of write transactions.

SUMMARY OF THE INVENTION

Viewed from a first aspect, the present invention provides apparatus for processing data, said apparatus comprising: a plurality of devices; bus circuitry providing connection paths between the plurality of devices; at least one of said devices having a bus master interface operable to generate write transactions for output via the bus circuitry; and at least one of said devices having a bus slave interface operable to receive said write transactions from the bus circuitry; wherein a write transaction includes transferring a write address from a bus master interface to a bus slave interface and separately transferring write data from said bus master interface to said bus slave interface; the bus master interface being allowed to generate a write transaction such that the write data is received at the bus slave interface before the associated write address.

In accordance with the present invention, the bus master interface is allowed to generate a write transaction such that the write data is received at the bus slave interface before the associated write address. This is counterintuitive, as the slave device responsible for storing the write data at the write address clearly cannot store the write data until the write address is received. Nevertheless, by allowing the write data to be received before the associated write address, the complexity of the apparatus can be significantly reduced, since there is no longer the requirement to include additional logic at each interface to re-align write data with the write address.

It will be appreciated that there are a number of ways in which the bus master interface may be allowed to generate a write transaction such that the write data is received at the bus slave interface before the associated write address. In one embodiment, the bus master interface may be arranged to begin transfer of the write data before transfer of the write address. In such embodiments, transfer of the write address may take place before completion of transfer of the write data, or instead the write address may be transferred when the processor has completed transfer of the write data.

However, in alternative embodiments, the bus master interface may be arranged to issue the write address either before, or at the same time as the write data, but with the write address taking longer to be propagated via the bus circuitry to the bus slave interface, with the result that the write data is received at the bus slave interface before the associated write address.

It will be appreciated that the bus circuitry can take a variety of forms. However, in one embodiment, the bus circuitry comprises an interconnect circuit providing an address channel for transfer of said write address and a separate write data channel for transfer of said write data. The address channel can utilise different physical connection paths to those used by the write data channel. Hence, such an interconnect circuit is one example of bus circuitry where the write address may take longer to be propagated from the bus master interface to the bus slave interface than may the associated write data, due to the different physical connection paths provided for the address channel and the write data channel, and hence where utilisation of the present invention avoids the need for additional logic to re-align the write data to the write address.

In one particular embodiment, each address channel and each write data channel is provided over one of said connection paths, at least one of the connection paths including one or more storage elements therein for temporarily storing data transferred by that connection path, the number of storage elements in the connection path of the address channel exceeding the number of storage elements in the connection path of the write data channel, thereby causing the write data to be received at the bus slave interface before the associated write address. Such storage elements are used to section a particular connection path into a number of path portions, with the signals propagated along that connection path then passing over one path portion during each clock cycle. The use of such storage elements can hence assist in enabling the interconnect circuit to meet the timing requirements of the apparatus in which that interconnect circuit is used, by ensuring that each path portion is traversable in a single clock cycle.

If the number of storage elements in the connection path of the address channel exceeds the number of storage elements in the connection path of the write data channel, this can cause the write data to be received at the bus slave interface before the associated write address even if the write address and write data are issued by the bus master interface at the same time, or even if the write address is issued prior to the write data. However, by removing the requirement that the write address must be presented to an interface prior to, or at the same time, as the write data, such storage elements can be used within the interconnect circuit without needing to provide additional logic at the device interfaces to re-align write data with the write address, thereby reducing the complexity of the apparatus.

It will be appreciated that the devices within the apparatus can take a variety of forms. In one embodiment, at least one of the devices is a bridge device operable to provide an interface between a first clock domain and a second clock domain of the apparatus, the bridge device having a bus slave interface in the first clock domain and a bus master interface in the second clock domain, the bridge device being operable to propagate from the bus master interface write data received at the bus slave interface without first aligning the write data with the write address. Such a bridge device is used at a clock domain boundary. At such a boundary both the write address and the write data are likely to be presented to their own clock domain crossing circuits, and accordingly it may be unpredictable as to the order in which they will cross the boundary and become valid in the destination clock domain. Hence, it will typically be necessary to include additional logic to ensure that the write data is re-aligned with the write address prior to being issued from the bus master interface of the bridge device. However, in embodiments of the present invention, this requirement is removed, thereby allowing the bridge device to propagate from the bus master interface the write data received at the bus slave interface without first aligning the write data with the write address.

In one embodiment, at least one of the devices is a slave device having a bus slave interface, the slave device having a buffer for storing the write data and the write address received at the bus slave interface, such that if the write data is received ahead of the write address, the connection path over which the write data is transferred is released for transfer of further write data before the associated write address has been received by the bus slave interface. The slave device is responsible for processing the write transaction to cause the write data to be stored at the write address specified by the write transaction. If the slave device has a buffer such as described above, it may accept the write data into that buffer without needing to know immediately the write address for the transaction. In such a case, the slave device effectively frees up the write data bus for use by another transfer, which could for example be further items of write data forming part of the same transaction, or may be write data pertaining to another write transaction, for example a write transaction generated by another bus master interface and destined for another bus slave interface.

In one embodiment, the write data of the write transaction comprises one or more write data items, each write data item being transferred separately between the bus master interface and the bus slave interface. Where a plurality of write data items are specified by the write transaction, this transaction is referred to as a burst write transaction, with the write address specifying a starting address for the write operation. The benefits realised when employing the techniques of preferred embodiments of the present invention in combination with burst write transactions can be particularly marked, since the write data can be transferred in a particularly efficient manner, without the need to re-align write data with the write address at the device interfaces.

Viewed from a second aspect, the present invention provides a method of handling write transactions in a data processing apparatus comprising a plurality of devices and bus circuitry providing connection paths between the plurality of devices, the method comprising the steps of: (i) generating write transactions at a bus master interface provided by at least one of said devices, for output via the bus circuitry; and (ii) receiving said write transactions from the bus circuitry at a bus slave interface provided by at least one of said devices; the write transaction including transferring a write address from a bus master interface to a bus slave interface and separately transferring write data from said bus master interface to said bus slave interface; at said step (i), the bus master interface being allowed to generate a write transaction such that the write data is received at the bus slave interface before the associated write address.

BRIEF DESCRIPTION OF THE DRAWINGS

The present invention will be described further, by way of example only, with reference to an embodiment thereof as illustrated in the accompanying drawings, in which.

DESCRIPTION OF AN EMBODIMENT

Figure 1:
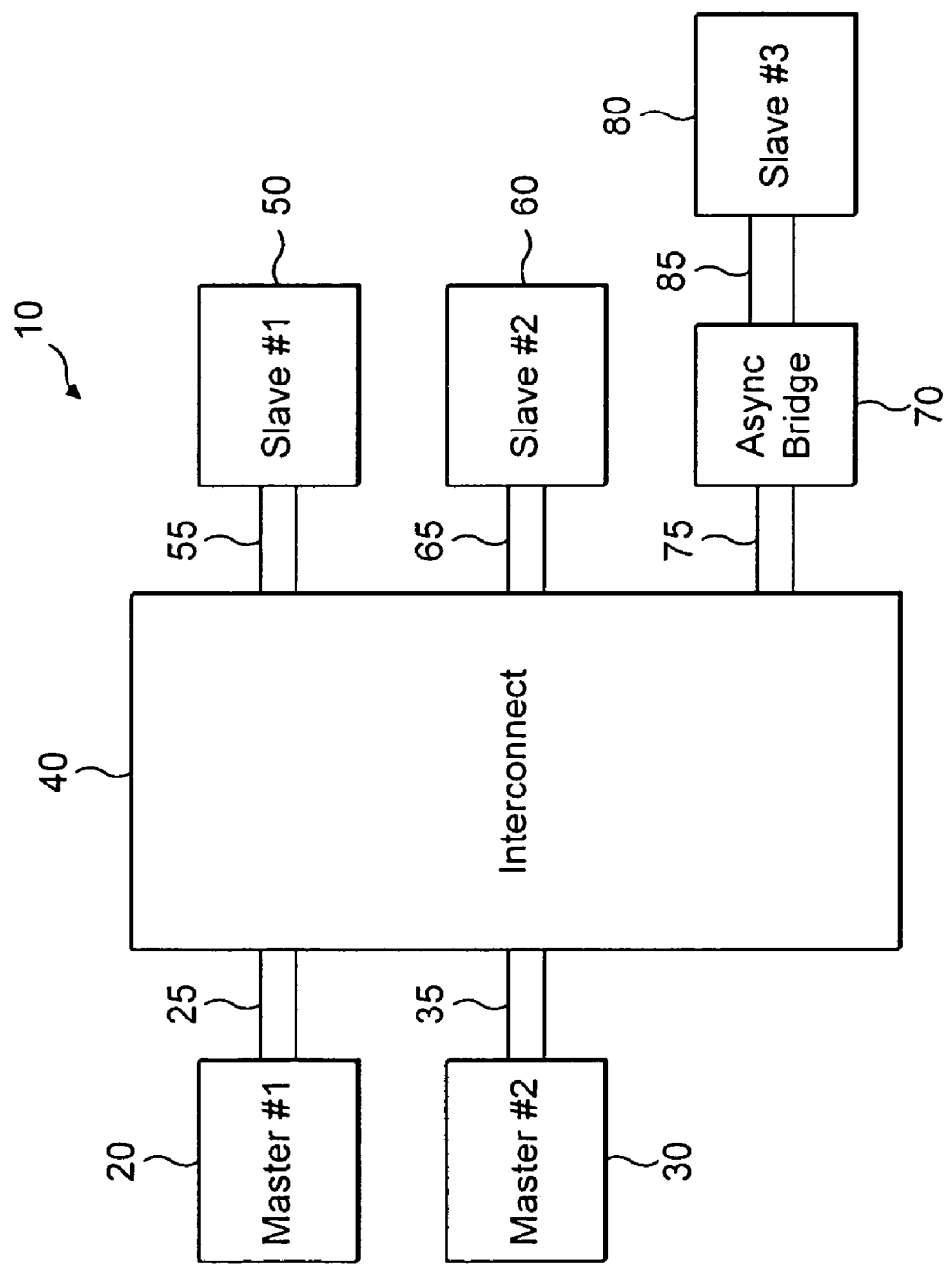
FIG. 1 is a diagram illustrating a data processing apparatus in accordance with one embodiment of the present invention.

FIG. 1 illustrates a data processing apparatus in the form of a System-on-Chip (SoC), which may be used within a device such as a personal organiser, a mobile phone, a television set-top box, etc. The SoC design 10 has a plurality of logic elements 20, 30, 50, 60, 70, 80 that are interconnected by an arrangement of buses. The actual interconnection of these buses is specified within an interconnect block or circuit 40. The interconnect block 40 includes a matrix of connection paths which provide for the interconnection of multiple bus master devices and bus slave devices within the SoC 10. Hence, each master device 20, 30 may be connected to corresponding buses 25, 35, respectively, whilst each slave device 50, 60, 80 may also be connected to corresponding buses 55, 65, 85, respectively, with the interconnect block 40 defining how these various buses are interconnected.

In the example illustrated in FIG. 1, it is assumed that the slave device 80 is provided within a different clock domain to the rest of the components of the data processing apparatus 10, and accordingly an asynchronous bridge circuit 70 is provided for converting signals passing to and from the slave device 80 between the two clock domains. The bridge circuit 70 is connected to the interconnect block 40 via bus 75. In other embodiments, the bridge circuit may be incorporated within the interconnect block 40.

The buses interconnecting the various elements of the apparatus 10 will typically operate in accordance with a specified bus protocol, and hence for example may operate in accordance with the "Advanced Microcontroller Bus Architecture" (AMBA) specification developed by ARM Limited, Cambridge, England.

Accordingly, it will be appreciated that the interconnect block 40 will describe a complex arrangement of interconnections between various master and slave devices. This complex arrangement may include a number of uni-directional channels of information. Within one or more of these channels there may be connections which are shared between multiple paths, and for which the interconnect block 40 needs to perform arbitration in order to ensure that at any point in time the data of only one transaction is being routed over such a shared connection.

One type of transaction which may be routed via the interconnect block is a write transaction, which is initiated by a master device 20, 30, and received and processed by a slave device 50, 60, 80. Each of the master devices 20, 30 will have a bus master interface for generating the write transaction, and each of the slave devices 50, 60, 80 will have a bus slave interface for receiving such write transactions. Other devices within the apparatus, such as the asynchronous bridge 70, may be considered to have both a bus master interface and a bus slave interface. For example, in the event of a write transaction issued by master device 20 to slave device 80, the asynchronous bridge 70 will have a bus slave interface for receiving over bus 75 the write transaction from the master device 20, and will also have a bus master interface for issuing the transaction over the bus 85 to the slave device 80.

A write transaction involves transferring a write address from a bus master interface to a bus slave interface and separately transferring associated write data from the bus master interface to the bus slave interface. A single item of write data may be specified within the write transaction, or alternatively a burst write transaction may be defined in which a plurality of items of write data are transferred in association with the write address.

Figure 2:
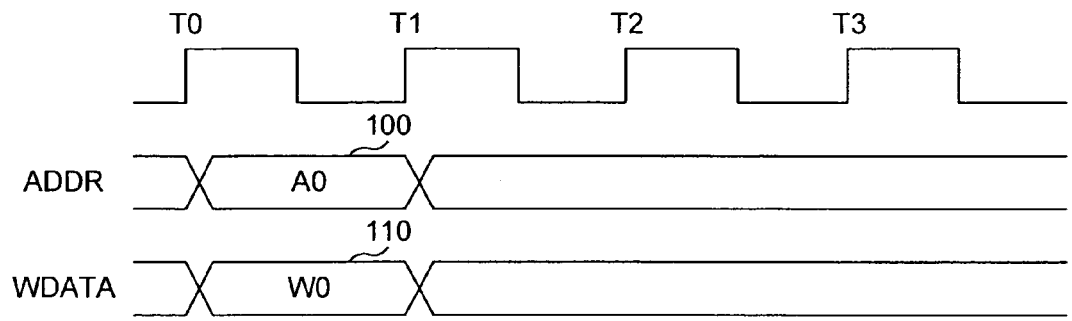
FIGS. 2 to 4 are timing diagrams illustrating relative timing of the write address and associated write data in certain situations.

In a typical data processing apparatus, the bus protocol will require that the write address is presented at an interface at the same time or before the associated write data for the write transaction. Hence, as shown in FIG. 2, an address 100 can be asserted from a bus master interface over the address channel at time TO, whilst at the same time the write data 110 is asserted over the write data channel. The timing illustrated in FIG. 2 can also apply to write transactions as received at a bus slave interface, and accordingly the write address 100 and write data 110 can be received at a bus slave interface at the same time.

Figure 3:
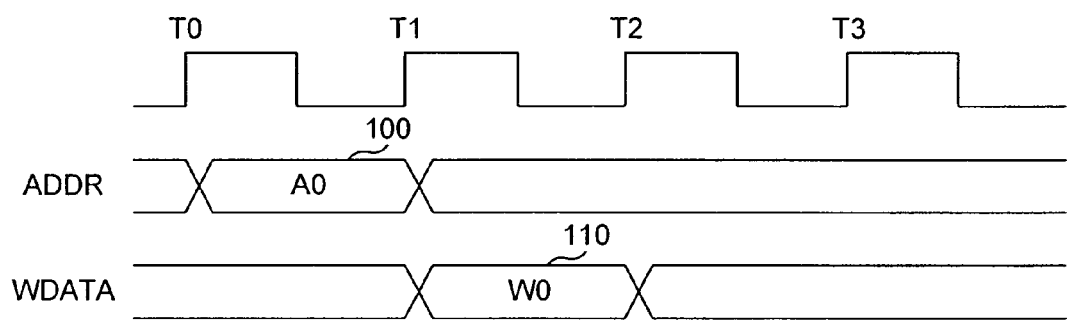

Similarly, with regard to FIG. 3, the bus protocol may allow the address 100 to be asserted from a bus master interface over the address channel prior to the assertion of the associated write data 110 from the bus master interface over the write data channel. Similarly, at a bus slave interface, the address 100 can be received prior to the write data 110. It will also be appreciated that there is no requirement for the write data 110 to be asserted, or received, in the clock cycle immediately following the write address 100, and indeed in some implementations there may be a number of intervening clock cycles between the write address and the associated write data.

Figure 4:
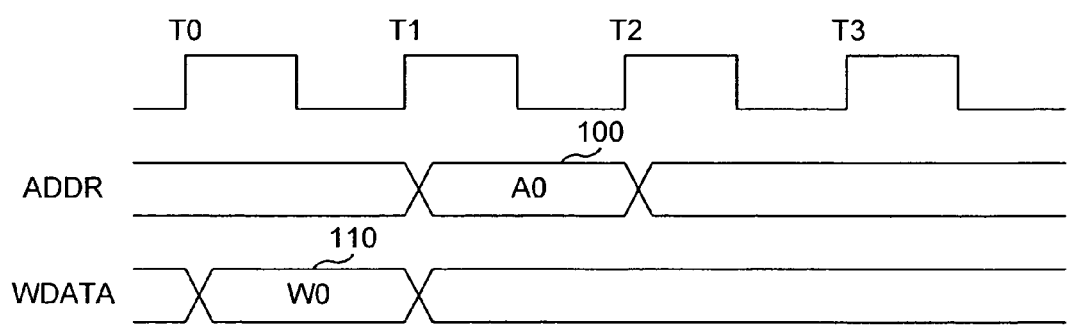

In accordance with embodiments of the present invention, in addition to the timing configurations illustrated schematically in FIGS. 2 and 3, a further timing configuration is supported by the bus protocol as illustrated in FIG. 4. More schematically, as shown in FIG. 4, write data 110 may be asserted by a bus master interface prior to the associated write address 100, and likewise such write data 110 may be received at a bus slave interface prior to receipt of the associated write address 100. The supporting of such a timing arrangement by the bus protocol is entirely counter-intuitive, as it will be appreciated that a slave device 50, 60, 80 receiving write data will be able to do little with that write data until the associated write address has been received.

Nevertheless, by supporting such a timing configuration, a significant reduction in the complexity of the logic of the data processing apparatus 10 can be realised. In particular, it is typical to include additional logic in association with the various bus master interfaces and bus slave interfaces to re-align write data with the associated write address in order to ensure compliance of the signals with the timing configurations discussed earlier with reference to FIGS. 2 and 3. By supporting the timing configuration illustrated schematically in FIG. 4, this additional logic can be omitted, thereby significantly decreasing the complexity of the apparatus 10.

In accordance with embodiments of the present invention, it is not envisaged that the timing of FIG. 4 will represent the usual timing of the write address and associated write data of a write transaction. Instead, it is still likely that a master device may issue the write address either before, or at the same time as, the write data. However, there are a number of situations where, despite this, the relative timing of the write address and write data at particular interfaces will conform to the timing illustrated schematically by FIG. 4.

Figure 5:
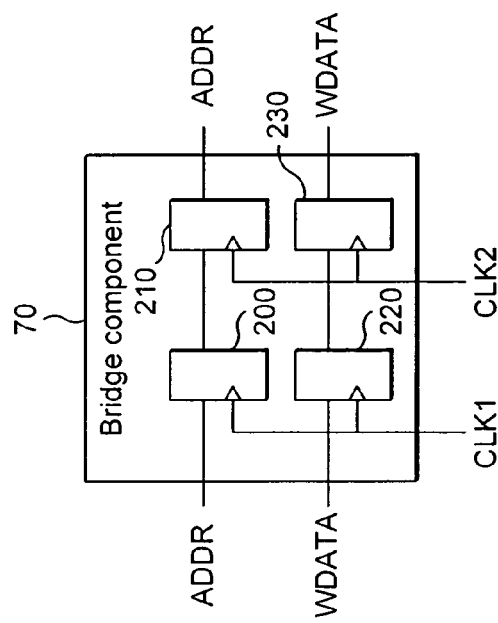
FIG. 5 is a diagram illustrating in more detail logic provided within the bridge circuit illustrated in FIG. 1.

One such situation arises due to the presence of the asynchronous bridge 70, which will be described in more detail with reference to FIG. 5. As can be seen from FIG. 5, both the address channel and the write data channel pass through the bridge circuit or component 70. A pair of registers 200, 210 are provided within the address channel, with the first register being clocked by a first clock signal of a first clock domain and the second register 210 being clocked by a second clock signal of a second clock domain. A similar pair of registers 220, 230 are provided for the write data channel.

The bridge component 70 causes signals received in the first clock domain to be resampled in the second clock domain. Since the first and second clock signals are asynchronous, the relative timing between the rising edges of the first clock signal and the second clock signal will vary over time, and due to factors such as slight differences in the path lengths of the address and write data channels within the bridge component 70, differences in temperature between the two paths, etc, it cannot be ensured that any relative timing between the write address and write data as seen at the input to the bridge component 70 will necessarily be reflected in the timing of the signals as resampled in the second clock domain. For example, if the write address and write data are clocked into the registers 200, 220, respectively, on the same rising edge of the first clock signal, they will not necessarily both be sampled on the same rising edge of the second clock signal in the second clock domain, and instead it is possible that the write data may be sampled before the write address. For example, on a particular rising edge of the second clock signal, the register 230 may store valid write data, whilst the register 210 may not yet store a valid write address.

Typically, it would hence be necessary to provide additional logic within the bridge component 70 to re-align the write data with the write address prior to issuance of the write address and write data from the bridge component 70. However, in accordance with embodiments of the present invention, since the relative timing illustrated in FIG. 4 is allowed by the bus protocol, no such additional logic is required.

Figure 6:
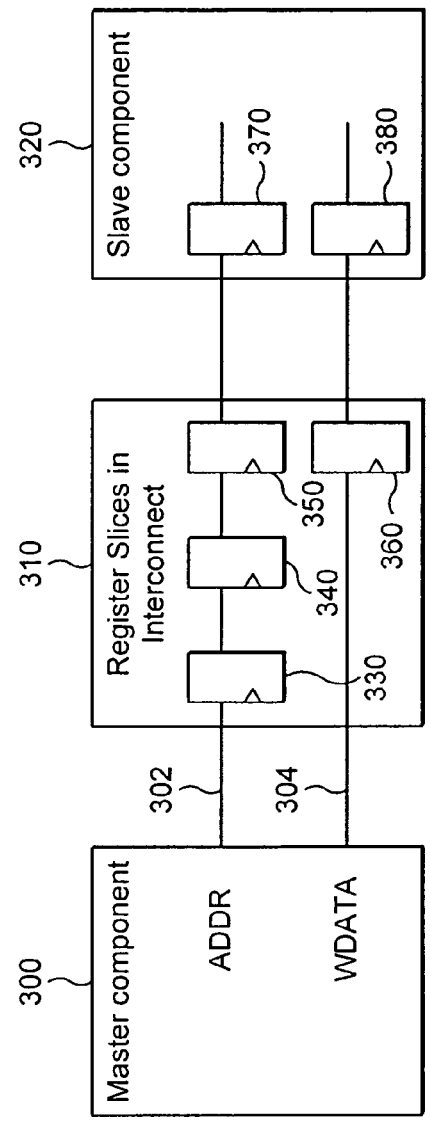
FIG. 6 is a diagram illustrating the insertion of register slices in both the address channel and the write data channel of the interconnect circuit shown in FIG. 1.

FIG. 6 schematically illustrates a second example situation where the write data may appear at an interface ahead of the associated write address. In particular, FIG. 6 illustrates an address channel 302 and a write data channel 304 passing between a master component 300 and a slave component 320. The interconnect logic 40 of FIG. 1 will provide the required path connections for the address channel 302, and the write data channel 304, and as illustrated in FIG. 6 a number of register slices 310 may be provided along various path connections of the interconnect. Register slices may be inserted into a particular path connection in order to section that path connection into a plurality of path portions, with each path portion being traversable by signals within a single clock cycle. A methodology and tool providing for the selective placement of such register slices within a bus interconnect block in order to meet timing requirements of the bus interconnect block is described in UK Patent Application No. 0313648.8 (a corresponding US Patent Application for which entitled "Improvements In Flexibility of Design of a Bus Interconnect Block for a Data Processing Apparatus" was filed on 18 May 2004), the subject matter of which is incorporated herein by reference.

Since the address channel 302 may pass via entirely separate physical connections to the write data channel 304, the number of register slices inserted within the connection path used by the address channel may exceed the number of register slices provided within the connection path used by the write data channel 304. In fact, it is quite likely that more register slices would be added to the address channel 302 paths than the write data channel 304 paths, because the address channel typically requires more manipulation within the interconnect logic 40, for example to perform address decoding, and therefore is likely to have a longer combinatorial path through the interconnect logic 40.

In the example illustrated in FIG. 6, it is assumed that three register slices 330, 340, 350 are inserted into the address channel 302, whilst only a single register slice 360 is inserted into the write data channel 304.

It will be appreciated that this can have the effect that, whilst the write address may be asserted by the master component 300 at the same time, or before, the associated write data, the write data may be presented to the slave interface of the slave component 320 ahead of the write address, due to the delays in propagating the write address incurred by the three register slices 330, 340, 350. In a typical prior art apparatus, additional register slice logic would need to inserted within the write data channel 304 to ensure that the write address and associated write data were re-aligned at the start of each clock cycle so as to ensure that the relative timing of the write address and write data was unchanged. However, due to preferred embodiments of the present invention allowing the relative timing illustrated in FIG. 4 to exist, such additional logic is not required, and hence the write data can be transmitted over the write data channel 304 without any such delay.

It will be appreciated that the slave component 320 may be arranged to force the re-alignment of the write data by manipulating its interface handshake signals such that it refuses to accept the write data until it has seen a valid write address associated with that write data. However, in an alternative embodiment as illustrated in FIG. 6, the slave component 320 will incorporate registers 370, 380 associated with the write address and write data channels for temporarily buffering the write addresses and write data received over those channels. Hence, the slave component 320 can receive into the register 380 write data without needing to know immediately the write address associated with that write data. In such a case, the slave component 320 can effectively free up the write data channel 304 for use for the transfer of further write data, for example further write data forming part of a burst write transaction, or indeed write data pertaining to an entirely different write transaction between a different master component and a different slave component. This can significantly improve the efficiency of the interconnect logic 40.

From the above description, it will be appreciated that by supporting the transfer of write data ahead of the associated write address, a significant reduction in the complexity of the design of the data processing apparatus 10, and a significant improvement in the efficiency of operation of the interconnect logic 40, can be realised.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Apparatus for processing data, said apparatus comprising:
a plurality of devices;
bus circuitry providing connection paths between the plurality of devices;
at least one of said devices having a bus master interface configured to generate write transactions for output via the bus circuitry; and
at least one of said devices having a bus slave interface configured to receive said write transactions from the bus circuitry; wherein
a write transaction includes transferring a write address from a bus master interface to a bus slave interface and separately transferring write data from said bus master interface to said bus slave interface;
the bus master interface being allowed to generate a write transaction such that the write data is received at the bus slave interface before the associated write address.

2. Apparatus as claimed in claim 1, wherein the bus master interface is configured to begin transfer of the write data before transfer of the write address.

3. Apparatus as claimed in claim 1, wherein the bus circuitry comprises an interconnect circuit providing an address channel for transfer of said write address and a separate write data channel for transfer of said write data.

4. Apparatus as claimed in claim 3, wherein each address channel and each write data channel is provided over one of said connection paths, at least one of the connection paths including one or more storage elements therein for temporarily storing data transferred by that connection path, the number of storage elements in the connection path of the address channel exceeding the number of storage elements in the connection path of the write data channel, thereby causing the write data to be received at the bus slave interface before the associated write address.

5. Apparatus as claimed in claim 1, wherein at least one of said devices is a bridge device configured to provide an interface between a first clock domain and a second clock domain of the apparatus, the bridge device having a bus slave interface in the first clock domain and a bus master interface in the second clock domain, the bridge device being configured to propagate from the bus master interface write data received at the bus slave interface without first aligning the write data with the write address.

6. Apparatus as claimed in claim 1, wherein at least one of said devices is a slave device having a bus slave interface, the slave device having a buffer for storing the write data and the write address received at the bus slave interface, such that if the write data is received ahead of the write address, the connection path over which the write data is transferred is released for transfer of further write data before the associated write address has been received by the bus slave interface.

7. Apparatus as claimed in claim 1, wherein the write data of the write transaction comprises one or more write data items, each write data item being transferred separately between the bus master interface and the bus slave interface.

8. A method of handling write transactions in a data processing apparatus comprising a plurality of devices and bus circuitry providing connection paths between the plurality of devices, the method comprising the steps of:
(i) generating write transactions at a bus master interface provided by at least one of said devices, for output via the bus circuitry; and
(ii) receiving said write transactions from the bus circuitry at a bus slave interface provided by at least one of said devices;
the write transaction including transferring a write address from a bus master interface to a bus slave interface and separately transferring write data from said bus master interface to said bus slave interface;
at said step (i), the bus master interface being allowed to generate a write transaction such that the write data is received at the bus slave interface before the associated write address.

9. A method as claimed in claim 8, wherein at said step (i) the bus master interface begins transfer of the write data before transfer of the write address.

10. A method as claimed in claim 8, wherein the bus circuitry comprises an interconnect circuit providing an address channel for transfer of said write address and a separate write data channel for transfer of said write data.

11. A method as claimed in claim 10, wherein each address channel and each write data channel is provided over one of said connection paths, at least one of the connection paths including one or more storage elements therein for temporarily storing data transferred by that connection path, the number of storage elements in the connection path of the address channel exceeding the number of storage elements in the connection path of the write data channel, thereby causing the write data to be received at the bus slave interface before the associated write address.

12. A method as claimed in claim 8, wherein at least one of said devices is a bridge device that provides an interface between a first clock domain and a second clock domain of the apparatus, the bridge device having a bus slave interface in the first clock domain and a bus master interface in the second clock domain, the method further comprising the step of:
propagating from the bus master interface of the bridge device write data received at the bus slave interface of the bridge device, without first aligning the write data with the write address.

13. A method as claimed in claim 8, wherein at least one of said devices is a slave device having a bus slave interface, the method further comprising the step of:
storing within a buffer of the slave device the write data and the write address received at the bus slave interface, such that if the write data is received ahead of the write address, the connection path over which the write data is transferred is released for transfer of further write data before the associated write address has been received by the bus slave interface.

14. A method as claimed in claim 8, wherein the write data of the write transaction comprises one or more write data items, each write data item being transferred separately between the bus master interface and the bus slave interface.

* * * * *